(12) United States Patent
Goncalves et al.

(10) Patent No.: US 11,260,886 B2
(45) Date of Patent: Mar. 1, 2022

(54) RAILWAY BRAKE SYSTEM FOR A RAILWAY VEHICLE

(71) Applicant: FAIVELEY TRANSPORT AMIENS, Amiens (FR)

(72) Inventors: Claudino Goncalves, Ribeaucourt (FR); Louis Maillard, Rivery (FR); Fabrice Laurent, Saint Gratien (FR); Guillaume Crosnier, Rosieres en Santerre (FR)

(73) Assignee: FAIVELEY TRANSPORT AMIENS, Amiens (FR)

( * ) Notice: Subject to any disclaimer, the term of this patent is extended or adjusted under 35 U.S.C. 154(b) by 98 days.

(21) Appl. No.: 16/611,885

(22) PCT Filed: Jun. 15, 2018

(86) PCT No.: PCT/FR2018/051428
§ 371 (c)(1),
(2) Date: Nov. 8, 2019

(87) PCT Pub. No.: WO2018/234665
PCT Pub. Date: Dec. 27, 2018

(65) Prior Publication Data
US 2021/0078617 A1 Mar. 18, 2021

(30) Foreign Application Priority Data
Jun. 19, 2017 (FR) ........................... 1755566

(51) Int. Cl.
*B60T 13/38* (2006.01)
*B61H 5/00* (2006.01)
(Continued)

(52) U.S. Cl.
CPC ............... *B61H 5/00* (2013.01); *B60T 13/38* (2013.01); *F16D 55/227* (2013.01);
(Continued)

(58) Field of Classification Search
CPC ......... B61H 5/00; B60T 13/38; F16D 55/227; F16D 65/095; F16D 2055/0029;
(Continued)

(56) References Cited

U.S. PATENT DOCUMENTS 4,491,204 A * 1/1985 Dirauf .................. F16D 65/097
116/208
5,249,647 A * 10/1993 Kobayashi ............ F16D 65/092
188/72.3
(Continued)

FOREIGN PATENT DOCUMENTS

| GB | 2257483 A | 1/1993 |
|----|-----------|--------|
| GB | 2516505 A | 1/2015 |
| JP | S6088237 A | 5/1985 |

OTHER PUBLICATIONS

International Search Report, dated Aug. 7, 2018, from corresponding PCT application No. PCT/FR2018/051428.

*Primary Examiner* — Vishal R Sahni
(74) *Attorney, Agent, or Firm* — The Small Patent Law Group LLC; Joseph M. Butscher (57) ABSTRACT

Disclosed is a brake system for a railway vehicle, including linings each having at least one positioning member for mechanically fastening the linings in a predetermined position on the system with respect to a disc of the vehicle and a bearing face for tightly gripping the disc under the action of an actuator of the system, and at least one return member for separating the linings from the disc in order to release it when the linings are freed from the action of the actuator; each lining has at least one fastening member formed on an edge, the return member has two opposite end lugs connected to one another by an elastic portion and each mechanically fastened with a the fastening member, and the (Continued)

system is configured such that the fastening members and the end lugs are situated at a distance from the at least one positioning member.

20 Claims, 8 Drawing Sheets

(51) Int. Cl.
*F16D 55/227* (2006.01)
*F16D 65/095* (2006.01)
*F16D 55/00* (2006.01)
*F16D 121/06* (2012.01)
*F16D 127/02* (2012.01)

(52) U.S. Cl.
CPC .... *F16D 65/095* (2013.01); *F16D 2055/0029* (2013.01); *F16D 2121/06* (2013.01); *F16D 2127/02* (2013.01); *F16D 2200/0004* (2013.01); *F16D 2200/0034* (2013.01); *F16D 2250/0061* (2013.01); *F16D 2250/0069* (2013.01); *F16D 2250/0076* (2013.01)

(58) Field of Classification Search
CPC ............. F16D 2121/06; F16D 2127/02; F16D 2200/0004; F16D 2200/0034; F16D 2250/0061; F16D 2250/0069; F16D 2250/0076
See application file for complete search history.

(56) References Cited

U.S. PATENT DOCUMENTS

| | | | | |
|---|---|---|---|---|
| 5,549,181 | A * | 8/1996 | Evans | F16D 65/097 188/216 |
| 6,598,715 | B2 * | 7/2003 | Hikari | F16D 55/228 188/24.22 |
| 6,957,724 | B2 * | 10/2005 | Gherardi | F16D 65/0975 188/73.38 |
| 7,467,693 | B2 * | 12/2008 | Barbosa | F16D 65/0973 188/72.3 |
| 2012/0312642 | A1 * | 12/2012 | Bosco, Jr. | F16D 65/0006 188/72.3 |
| 2014/0047690 | A1 * | 2/2014 | Plantan | F16D 65/095 29/407.09 |

* cited by examiner

RAILWAY BRAKE SYSTEM FOR A RAILWAY VEHICLE

FIELD OF THE INVENTION

The invention concerns the field of the braking of rail vehicles and more particularly rail vehicle braking systems for rail vehicles provided with a parking brake configured to act on a braking member of the vehicle, for example such as a disk brake, with the use of brake linings, in particular when the rail vehicle is stationary.

TECHNOLOGICAL BACKGROUND

Rail vehicles are generally equipped with service brake and/or parking brake calipers provided with a service brake and/or parking brake cylinder.

This cylinder comprises a brake piston movable under the effect of the action of one or more springs and furthermore movable under the effect of a fluid under pressure.

More specifically, this type of brake cylinder comprises a body in which and relative to which the brake piston is movable to act on the braking member via a thrust rod.

The brake cylinder also comprises a cavity configured in the body and provided to receive the springs, as well as a pressure chamber formed at least partly in the cavity, delimited in particular by the braking piston and by the body, and connected by a pipe to a source of pressure agent.

The brake linings are mounted on brake calipers and are supported by the brake cylinder by virtue of lining-carrier shafts which pass through the linings while avoiding the brake disk and which are mechanically connected to the cylinder.

The displacement of the brake piston under the effect of the springs leads to a braking action such as the clamping of a brake disk between two brake linings, which linings are displaced under the action of the braking piston.

On the contrary, the displacement of the braking piston under the effect of the fluid under pressure leads to an opposite action to the braking, i.e. the unclamping of the brake and thereby enables the brake to be let off.

Conventionally, the brake linings separate from the brake disk under the action of compression springs housed between the two linings and which are wound around the lining-carrier shafts.

More specifically, when the pressure chamber is not supplied by the source of pressure agent, the springs are configured to act on the braking piston to place it in a braking position; whereas when the pressure chamber is supplied by the source of pressure agent, the braking piston acts against the springs to return into a resting position in which the brake is readied but not applied and the springs are compressed.

In other words, to ready the brake, the pressure chamber is supplied with pressure agent, also called fluid under pressure, via the corresponding source so as to move the braking piston within the body and compress the springs; whereas to apply the brake, the pressure chamber is vented, such that the springs push the braking piston.

It will be noted that the action of braking or, in other words, the tight application of the brake linings against the brake disk conventionally leads to wear of those linings, and regularly requires their replacement.

SUBJECT OF THE INVENTION

The invention concerns a braking system for a rail vehicle, with improved performance in particular in terms of safety and use, while being simple, convenient and economical.

The invention thus relates to a rail vehicle braking system for a rail vehicle having brake members with linings and at least one disk, comprising at least one set of said linings, each lining having at least one positioning member configured to enable the mechanical connection of each said lining in a predetermined position on said system relative to said disk and a main bearing face configured to come into contact with said disk to clamp it under the direct or indirect action of an actuator of said system, and further comprising at least one return member configured to separate said linings from said disk to unclamp it when said linings are released from the direct or indirect action of said actuator;

said system being characterized in that each lining has an edge surface and at least one connecting member provided on said edge surface, said at least one return member has two end lugs which are opposite, connected to each other by an elastic portion, and configured for each to be mechanically connected with a said connecting member of said respective linings, and said system is configured such that said connecting members and said end lugs are located at a distance from said at least one positioning member.

The braking system according to the invention makes it possible, by making the return member or members for return of the linings distinct from the positioning members, and furthermore by placing at a distance the connecting members for the end lugs of the return member or members and the positioning members, to have better control both over the return force applied on the linings and over the zones of application of that force on those linings.

In addition, in the system according to the invention, the fact of having one or more return members that are distinct and not joined to the positioning members, and therefore to the lining-carrier shafts which are provided to be inserted into the positioning members, enables easy mounting/dismantling of the linings when these are to be changed.

In particular, for the mounting, the return member or members may be assembled on linings and the assembly may be mounted in the braking system, in particular in a predetermined position on opposite sides of the brake disk, and then the linings can be locked in that position by insertion of the lining-carrier shaft or shafts into the positioning members, without having to act on the return member or members. For dismantling, the linings can be unlocked from their position by removal of the lining-carrier shaft or shafts of the positioning members, without having to act on the return member or members, and then that member or those members can be removed from the braking system, together with the linings.

It will also be noted that the return member is only mounted in the system via its end lugs which are connected to the linings, the rest of the return member thus being free within the system. In other words, the return member is not mounted on the body of the system or even on a positioning member of the linings.

The braking system according to the invention thus provides particularly good performance in terms of safety and use, while being simple, convenient and economical.

According to preferred, simple, convenient and economical features of the system according to the invention:

- each said connecting member extends, in cross-section, at the location of a bearing zone defined by said bearing face of said respective lining;
- each said positioning member is provided outside said bearing zone of said respective lining.
- each said lining has several sides defining its edge surface and said at least one respective connecting member is provided substantially at the center of one of said sides;

at least one said connecting member is formed by an aperture provided in said edge surface or by a bridging member projecting from said edge surface;

each said lining comprises a base and a layer of a friction material added onto said base, and at least one said connecting member is provided in the base or in the layer of friction material;

said elastic portion of said at least one return member comprises two branches each connected to a respective end lug and further comprises a joining section connecting the two said branches, said system being configured such that said branches extend from said end lugs at a distance from said linings and said joining section is provided to be at a remote opposite location from the disk;

said at least one return member is formed by a torsion spring or by a blade spring;

said end lugs of said at least one return member are formed by folded ends of said elastic portion or by added-on parts;

said end lugs of said at least one return member are mechanically connected with said respective connecting members by insertion by force, or by welding, or by riveting or by bonding;

said at least one return member is formed of metal or plastic material and is configured to apply a force of the order of approximately 30 N to approximately 100 N to said linings;

said system comprises two said return members and four said connecting members, which are disposed on opposite sides of the two said linings, preferably symmetrically;

said system comprises a said parking brake having a body provided with a cylinder having a cavity, with a said lining mounting mechanically connected to said cylinder and configured to bear said linings and receive said disk at least partly, and with a said actuator comprising a braking piston at least partly housed in said cavity, movable relative to said body and configured to act on at least one said lining through said lining mounting;

said lining mounting comprises two jaws separated by a space provided to receive at least partly said disk, as well as at least one lining-carrier shaft configured to cooperate with said positioning members of said linings and lock these latter in said predetermined position, said at least one lining-carrier shaft being located at a distance from said disk when the latter is received in said space between said jaws; and/or a first of the two said jaws is mounted on said cylinder while a second of the two said jaws is mounted on said first jaw via at least one column which extends from said first jaw, and said braking piston acts directly on said lining mounted on said first jaw and indirectly, by movement of said body via said at least one column and via said second jaw, on another said lining mounted on that second jaw.

It is to be noted that the parking brake is normally applied when the rail vehicle is stationary, so as to keep that vehicle immobilized and enable its user and in particular its driver to leave the vehicle. The parking brake is not dimensioned to stop the rail vehicle in locomotion but only to keep it stationary. However, the system according to the invention may also be used for a service brake which makes it possible to brake the vehicle when the latter is in locomotion.

BRIEF DESCRIPTION OF THE DRAWINGS

The disclosure of the invention will now be continued with the description of an example embodiment, given below by way of illustrative and non-limiting example, with reference to the accompanying drawings, in which.

DETAILED DESCRIPTION OF AN EMBODIMENT

Figure 1:
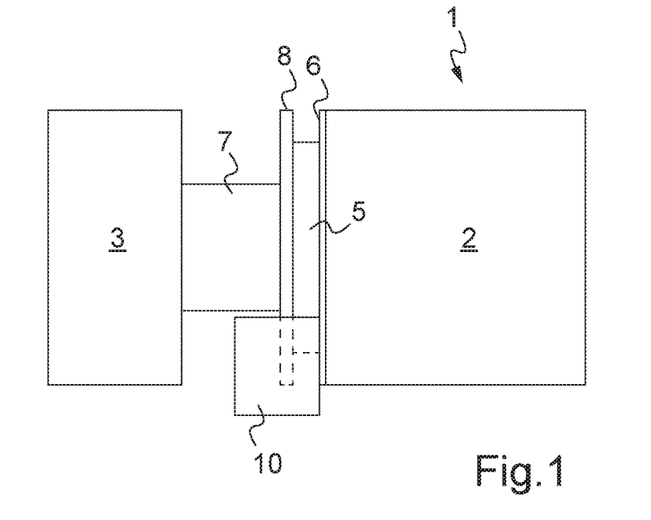
FIG. 1 partially and diagrammatically illustrates a rail vehicle provided with a parking brake disk, referred to as drive system disk, on which is mounted a rail vehicle braking system in accordance with one embodiment of the invention.

FIG. 1 represents partially and diagrammatically a rail vehicle 1, for example of subway type, provided with an electric traction driving system 2, in particular here a rotary electrical machine operating in drive mode, and an axle 3 bearing wheels (not shown) and which is connected to the driving system 2 for imparting rotation to the wheels via a coupling system 4.

This coupling system 4 here comprises a coupling plate 5 mechanically connected to a drive system flange 6 of the driving system 2, as well as a mechanism with a hub 7 connected at one end to the coupling plate 5 and at an opposite end to the axle 3.

The rail vehicle 1 is furthermore provided with a brake disk 8, here referred to as drive system disk, which is interposed between the coupling plate 5 and the mechanism with a hub 7.

It will be noted that in FIG. 1, the general direction of extension of the assembly formed by the driving system 2 and the coupling system 4 is substantially longitudinal, while the general direction of extension of each of the axle 3 and the drive system disk 8 is substantially transverse.

The rail vehicle 1 is also provided with a rail vehicle braking system 10 here mechanically connected to the drive system flange 6 and configured to be in engagement with the drive system disk 8 so as to lock it when the rail vehicle 1 is stationary and/or to leave it free when the rail vehicle 1 is in locomotion.

Figure 2:
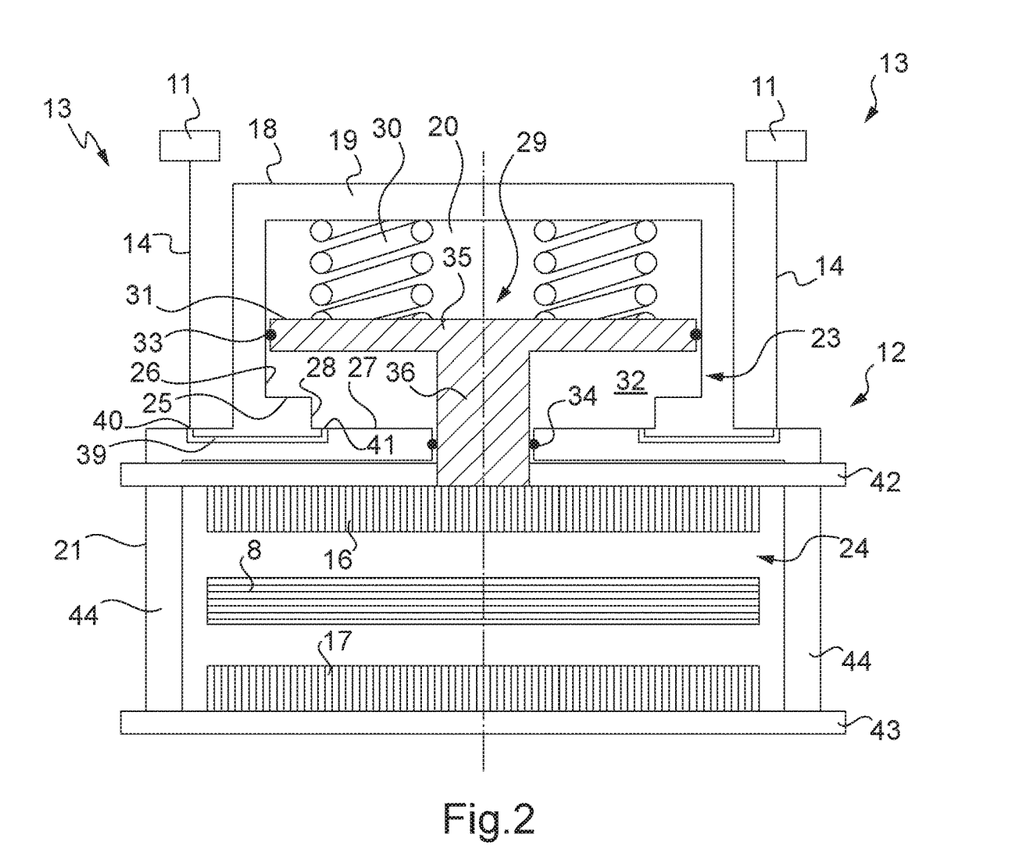
FIG. 2 diagrammatically illustrates the rail vehicle braking system of FIG. 1.
Figures 3, 4:
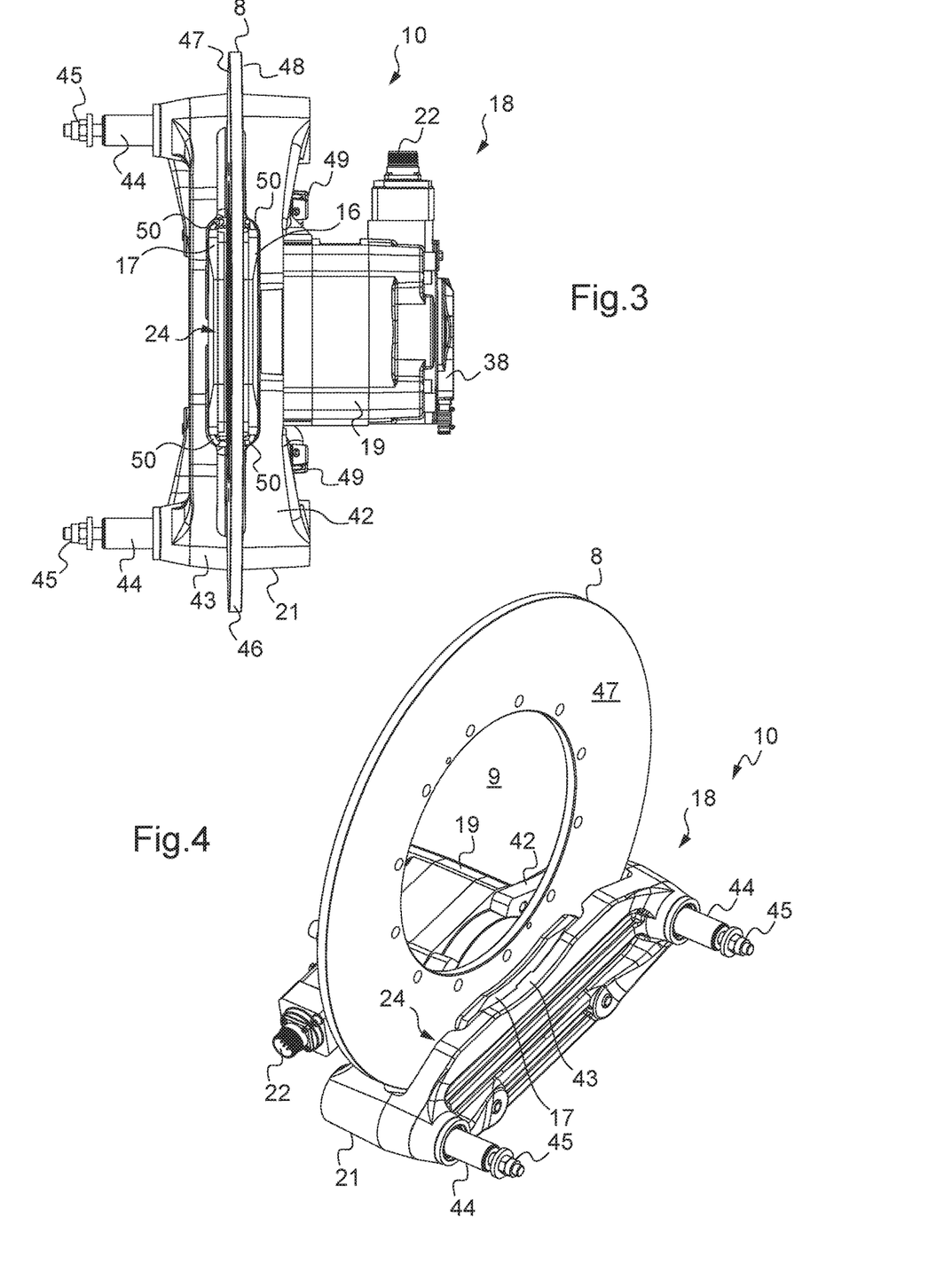
FIGS. 3 to 6 represent in perspective and from different viewing angles, the rail vehicle braking system according to the invention associated with the drive system disk.
Figure 5:
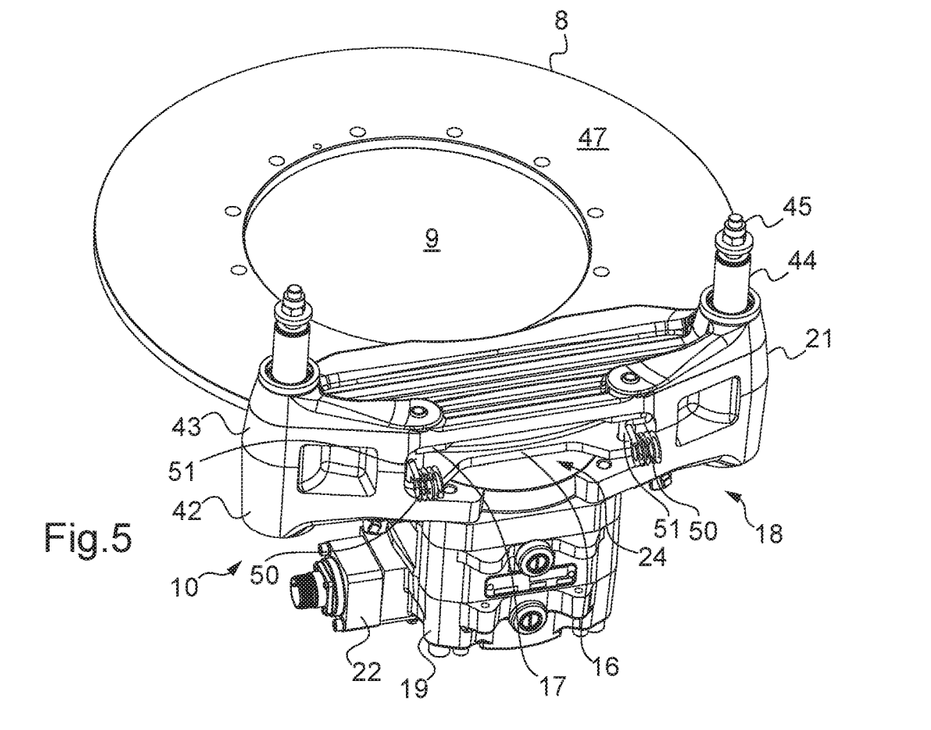
Figure 6:
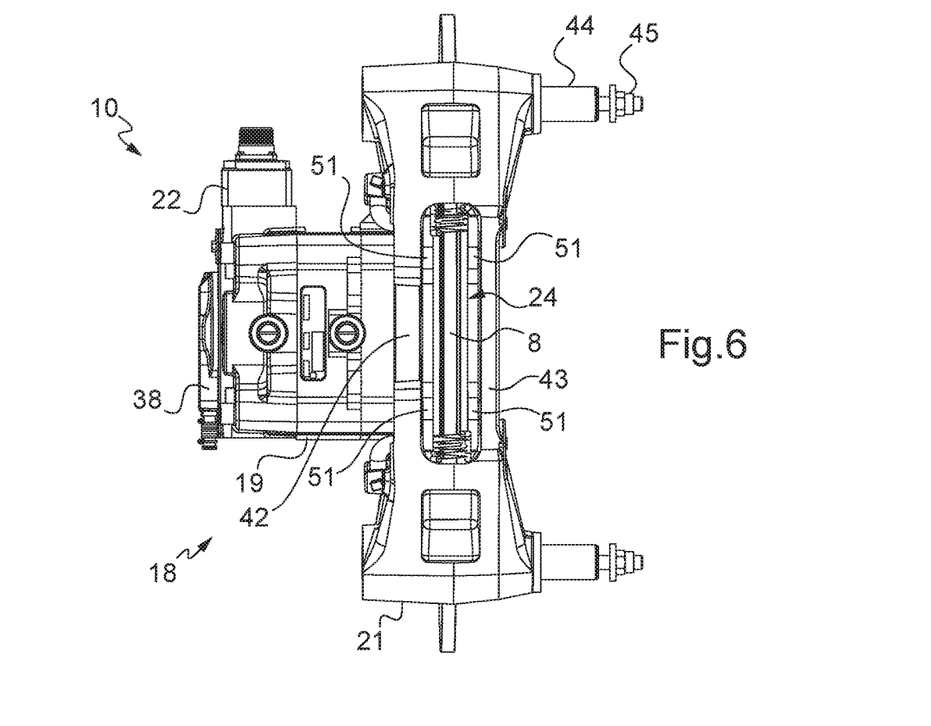

FIG. 2 illustrates diagrammatically and partially the rail vehicle braking system 10 engaged with the drive system disk 8.

This rail vehicle braking system 10 is provided with a parking brake 12 here formed by a floating movable caliper, which can be seen in this Figure in a configuration in which the parking brake 12 is not applied to the drive system disk 8.

The rail vehicle braking system 10 further comprises a supply network 13 for a pressure agent, here pneumatic, provided in particular with a source of pressure agent 11 which is connected to the parking brake 12 via a distribution pipe 14.

The rail vehicle braking system 10 also comprises a braking member here provided with the drive system disk 8 and with a set of two linings 16 and 17 configured to sandwich the disk 8.

The parking brake 12 comprises a body 18 provided with a first portion 19 in which is provided a cavity 20, and with a second portion 21 mechanically connected to the first portion 19.

The first portion 19 is called brake cylinder and the second portion 21 is called lining mounting.

The body 18 is furthermore provided with an inside wall 23 delimiting the cavity 20 provided in the cylinder 19 and forming a barrier between that cavity 20 and a clamping space 24 defined by the lining mounting 21.

This inside wall 23 has a first section 25 extending from an inside face 26 of the cylinder 19 and a second section 27 connecting to the first section 25 via a shoulder 28.

The parking brake 12 further comprises an actuator 29 provided with a spring member 30 (also called member with springs) housed in the cavity 20 of the cylinder 19 and a braking piston 31 that is movable relative to the body 18 and which delimits with the body 18 a parking brake pressure chamber 32.

This pressure chamber 32 is provided in the cavity 20 and delimited by the braking piston 31, by the inside face 26 of the cylinder 19 and by the inside wall 23 of the body 18.

The braking piston 31 here comprises a head 35 housed in the cavity 20 and a thrust rod 36 extending from the head 35 and projecting into the clamping space 24 through an opening 37 provided in the inside wall 23 of the body 18.

The head 35 is movable relative to the body 18 in the cavity 20 in a first axial direction, and the thrust rod 36 is also movable relative to the body 18 both within the cavity 20 and within the clamping space 24 in the first axial direction.

The parking brake 12 is furthermore provided with a first sealing member 33 interposed between the head 35 of the braking piston 31 and the inside face 26 of the cylinder 19, and with a second sealing member 34 interposed between a free edge 38 of the inside wall 23 at the location of the opening 37 and the thrust rod 36 of the braking piston 31.

The pressure chamber 32 is connected to the distribution pipe 14 by a channel 39 provided in the body 18, which channel 39 opens at a first end to the outside of the body 18 by a first aperture 40 where the pipe 14 connects and also opens at a second end, which is an opposite end to the first end, into the pressure chamber 32 by a second aperture 41.

The lining mounting 21 of the parking brake 12 is here provided with a first jaw 42 mounted on the cylinder 19 and with a second jaw 43 mounted on the first jaw 42 via columns 44 which extend from the first jaw 42, on an opposite side to the cylinder 19.

The brake lining 16 is mounted here on the first jaw 42, on one side of the drive system disk 8, while brake lining 17 is mounted here on the second jaw 43, on the other side of the drive system disk 8.

The parking brake 12 is configured here such that the braking piston 31 is provided to act directly, via the first jaw 42, on the brake lining 16 which comes into contact with the drive system disk 8.

As mentioned above, the parking brake 12 is arranged here as a floating caliper such that it is first of all the action of moving the braking piston 31 and the lining 16 in a first axial direction towards the disk 8, the lining 16 coming to apply a force on one side of the disk 8, and, when that force reaches a predetermined threshold, it is the whole of the body 18 which moves, thanks to the action of the columns 44, in a second axial direction opposite the first axial direction, to advance the lining 17 and also come to apply a force with the latter on an opposite side of the disk 8.

FIGS. 3 to 6, then 7 and 8, are perspective illustrations from different viewing angles, of the rail vehicle braking system 10 first in engagement with the drive system disk 8, then in isolation, that is to say without the drive system disk 8.

In particular, the disk 8 here has an annular shape, bored with a central hole 9 and is provided with a contour 46 joining two opposite faces 47 and 48.

When the rail vehicle braking system 10 is fastened on the drive system flange 6, here thanks to screw-nut systems 45 mounted at the free ends of the columns 44, the disk 8 is partially inserted, by its edge surface 46, into the space 24 provided between the jaws 42 and 43 of the lining mounting 21. In this position, the disk 8 is housed between the linings 16 and 17.

The rail vehicle braking system 10 is here equipped with two lining-carrier shafts 51 which are provided to keep them, substantially transversely, in a predetermined position within the space 24.

In particular, these two lining-carrier shafts 51 are configured to pass through the linings 16 and 17 and to be inserted into wells 77 and 78 respectively provided in the jaws 42 and 43.

In other words, the lining-carrier shafts 51 carry the linings 16 and 17 such that these latter are located respectively facing the faces 48 and 47 of the disk 8.

The rail vehicle braking system 10 is furthermore provided with two return members 50, each mechanically connected to the two linings 16 and 17, and which are configured to move them apart from the disk 8 to unclamp it when the linings 16 and 17 are released from the action, direct or indirect, of the actuator 29.

Figure 7:
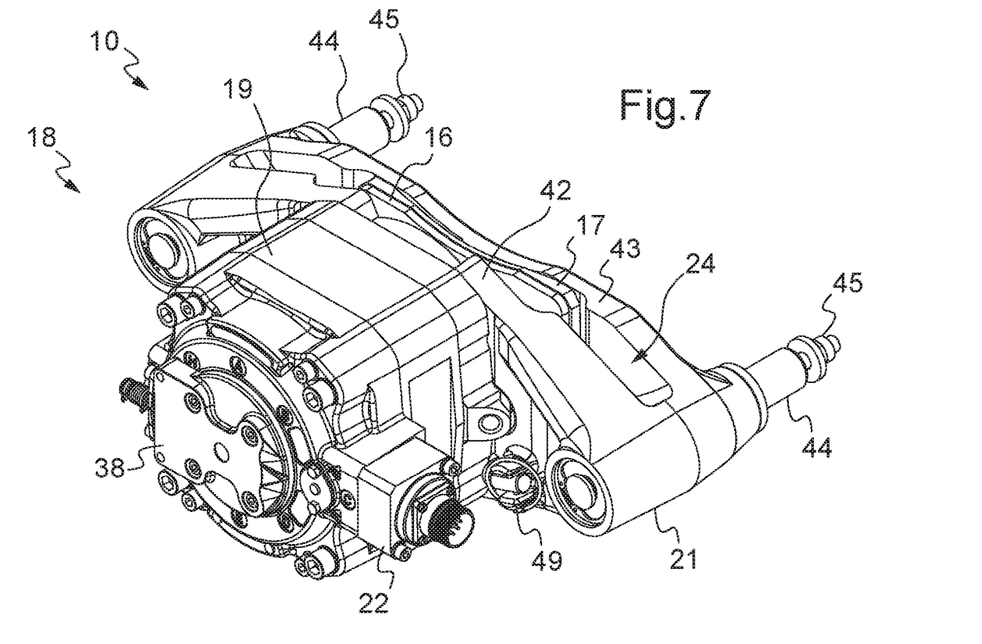
FIGS. 7 and 8 represent in perspective and in isolation from two different viewing angles, the rail vehicle braking system according to the invention, without the drive system disk.
Figure 8:
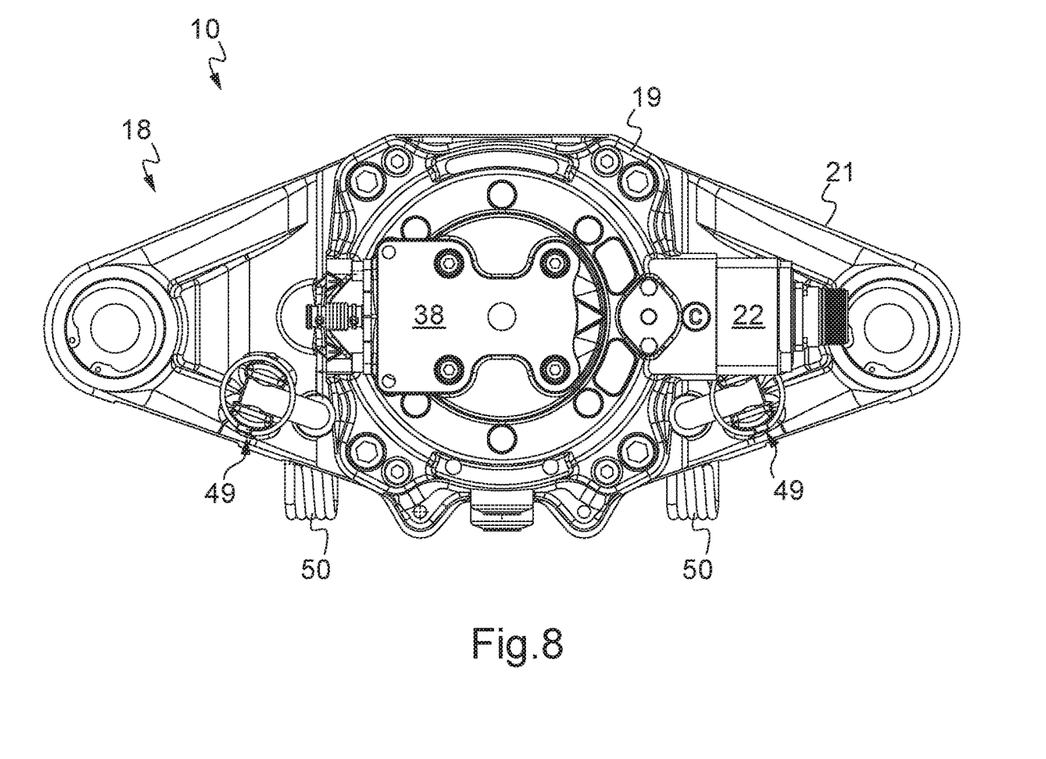
Figure 9:
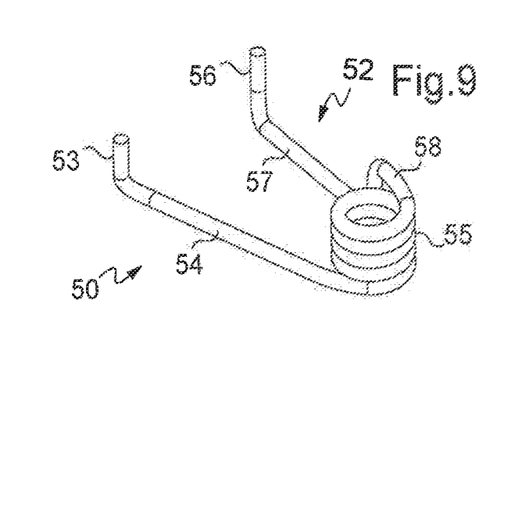
FIGS. 9 to 14 illustrate a return member of the rail vehicle braking system according to the invention, from different viewing angles.

The rail vehicle braking system 10 has also equipped here with assembly mechanisms for example of the pin-clip or screw-nut type, to provide for the mounting of the lining mounting 21 on the cylinder 19.

This rail vehicle braking system 10 further comprises a mechanism 38 for manual unlocking of the actuator 29, mounted on the cylinder 21 and provided to bring the braking piston 31 back from a position of generally longitudinal advancement in which it acts on the lining 16 to a position of generally longitudinal withdrawal in which it does not act on that lining 16.

This rail vehicle braking system 10 also comprises a mounting 22 for indicators, which is mounted on the cylinder 21 and has a plurality of system components provided for example to perform different measurements in the cylinder 21 and/or to transmit and/or process the data obtained by those measurements. FIGS. 9 to 14 illustrate one of the return members 50. The two return members are identical here.

Each return member 50 is formed here by a torsion spring, for example formed from metal material.

The springs 50 are each configured to apply a force of the order of approximately 30 N to approximately 100 N, preferably between 45 N and 90 N, on the respective linings 16 and 17.

Each spring 50 has two end lugs 53 and 56 which are opposite and connected to each other by an elastic portion 52.

The elastic portion 52 comprises two branches 54 and 57 respectively connected to the end lugs 53 and 56, as well as a joining portion 55 connecting the two branches 54 and 57.

The end lugs 53 and 56 are here formed by folded ends of the elastic portion 52 and more particularly, respectively, of the branches 54 and 57.

The joining portion 55 is formed here by coil turns, from an opposite end of the branch 54 from the end lug 53, to an elbow section 58 which is connected to an opposite end of the branch 57 from the end lug 56.

The elbow section 58 here has the general shape of an L, and has a first arm which extends a turn of the joining portion 55 and a second end, connected to the first arm and which extends generally transversely to the joining portion 55 until it meets the branch 57.

The spring 50 is thus configured such that the branches 54 and 57 extend substantially within a same plane P and provide substantially similar forces via respective end lugs 53 and 56.

Figures 10, 12:
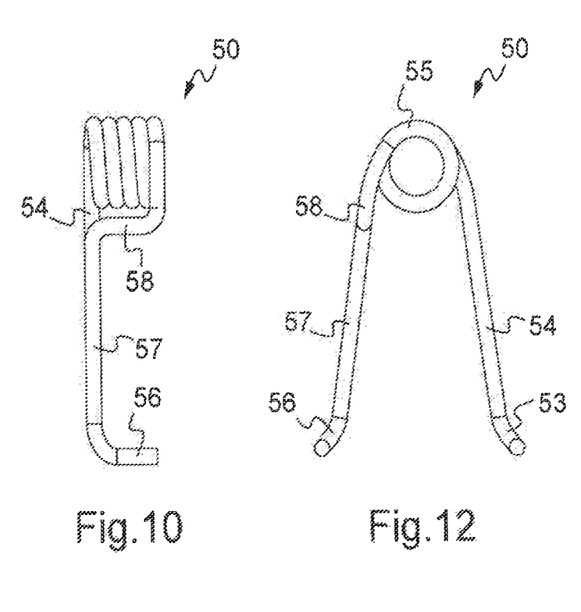
Figure 11:
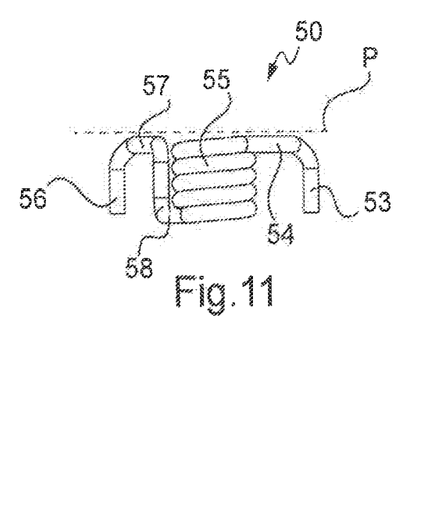

It will be noted that in FIG. 12, the spring 50 is shown in a so-called free or mounting configuration, that is to say with the branches 54 and 57 having a maximum separation by default, in an unbiased condition.

Figure 13:
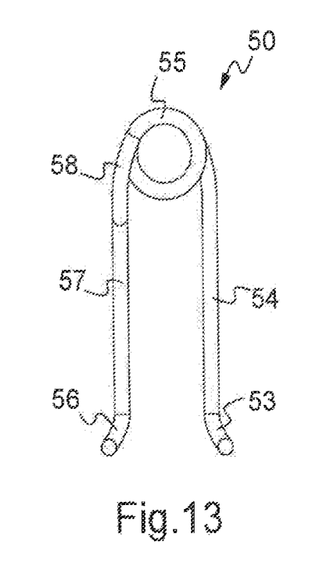

In FIG. 13, the spring 50 is shown in a so-called locomotion configuration, with the branches 54 and 57 having a maximum separation in use, when the spring 50 is engaged with the linings 16 and 17, which are not applied onto the disk 8 and are in a new state.

Figure 14:
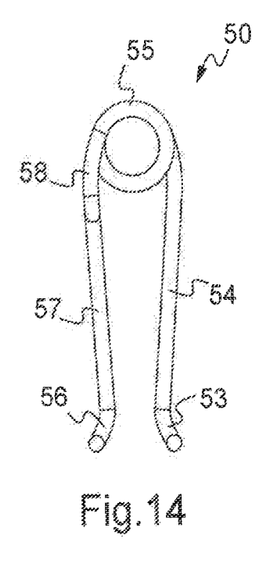
Figures 15, 16, 17, 18:
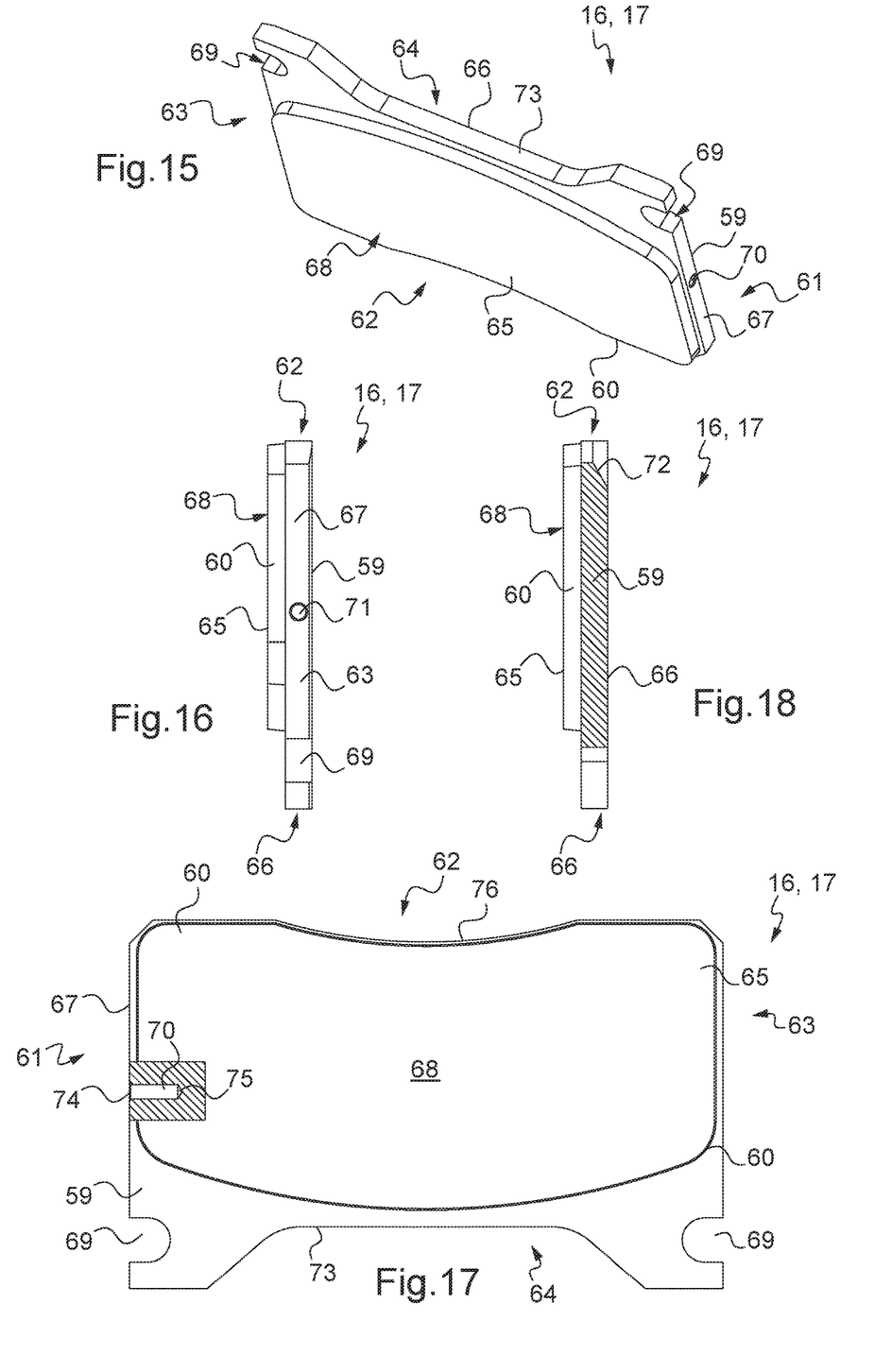
FIGS. 15 to 18 illustrate a brake lining of the rail vehicle braking system according to the invention, from different viewing angles.

In FIG. 14, the spring 50 is shown in a so-called braking configuration, with the branches 54 and 57 having a substantially minimum separation, when the spring 50 is engaged with the linings 16 and 17, which are applied onto the disk 8 and are in a used state.

It will be noted that in this braking configuration with used linings, the spring is dimensioned such that it does not come into contact with the disk.

FIGS. 15 to 18 illustrate the linings 16 and 17, which are identical here.

These linings 16, 17 each have a first side 61, a second side 62, a third side 63 and a fourth side 64.

The first side 61 and the third side 63 are opposite here, and the second side 62 and the fourth side 64 are opposite here and each meet the first side 61 and the third side 63.

These linings 16, 17 each comprise a base 59 and a layer of a friction material 60 added-on to the base 59.

Each lining 16, 17 has a main bearing face 65 formed by a layer of a friction material 60 and by a portion of the base 59, as well as a back face 66, which is an opposite face to the bearing face 65, and which here is formed only by the base 59

It will be noted that the portions of the bearing faces 65 of the linings 16, 17 which are provided to come into contact with the respective faces 47, 48 of the disk 8, form bearing zones 68, formed solely by at least part of the layer of friction material 60 of the respective linings 16, 17.

Each lining 16, 17 has an edge surface 67 defined by its first, second, third and fourth sides 61 to 64.

Each lining 16, 17 here has two positioning members 69 configured to enable the mechanical connection of these linings in the predetermined position on the system 10 relative to said disk 8, as explained above.

In particular, these positioning members are formed here by notches 69 provided in the edge surface 67, respectively on the first and third sides 61 and 63 of each lining 16, 17.

These notches 69 are configured to be passed through by the lining-carrier shafts 51.

These notches 69 are here provided in the base 59 and outside the bearing zone 68.

Each lining 16, 17 furthermore has two connecting members 70, 71 provided on the edge surface 67.

These connecting members are formed here by apertures 70, 71 respectively provided on the first and third sides 61 and 63 of each lining 16, 17.

These apertures 70, 71 are provided here in the base 59 and are situated substantially at the location of the bearing zone 68, at a distance from the notches 69.

Furthermore, these apertures 70, 71 are open at an end 74 substantially at the center of the first and third respective sides 61 and 63, and are blind at an opposite end 75.

The apertures 70, 71 of the linings 16, 17 are configured here respectively to receive the end lugs 56 and 53 of the springs 50. The arrangement of the return springs 50 for the linings 16, 17 inside the jaws 42 and 43 is such that these springs 50 cannot accidentally come out of the apertures 70, 71 when they are in place on the linings 16, 17. As a matter of fact, in this configuration, the play remaining between the springs and the jaws is sufficiently small to prevent the end lugs from coming out of the apertures.

As a variant, the apertures of the linings may be configured to receive, for example by insertion with force, or by welding, or by riveting or for instance by bonding, respectively the end lugs of the springs.

In particular, the apertures 70 and 71 of the lining 16 are provided to receive respectively the end lug 56 of a first spring 50 and the end lug 53 of a second spring 50; while the apertures 70 and 71 of the lining 17 are provided to receive respectively the end lug 56 of the second spring 50 and the end lug 53 of the first spring 50.

Each lining 16, 17 is furthermore provided here with a chamfer 72 formed in the base 59, on the second side 62, at the location of the edge surface 67 and the opposite face 66.

Each lining 16, 17 is also provided here with a fillet 76 formed in its second respective side 62 and of which the concavity is directed towards the fourth side 64 which is an opposite side to the second side 62.

Each lining 16, 17 is also provided here with a recess 73 formed in its fourth respective side 64.

FIGS. 19 to 23 diagrammatically and partially illustrate the mounting of the linings 16 and 17 in the space 24 using the springs 50 and the lining-carrier shafts 51.

Figure 19:
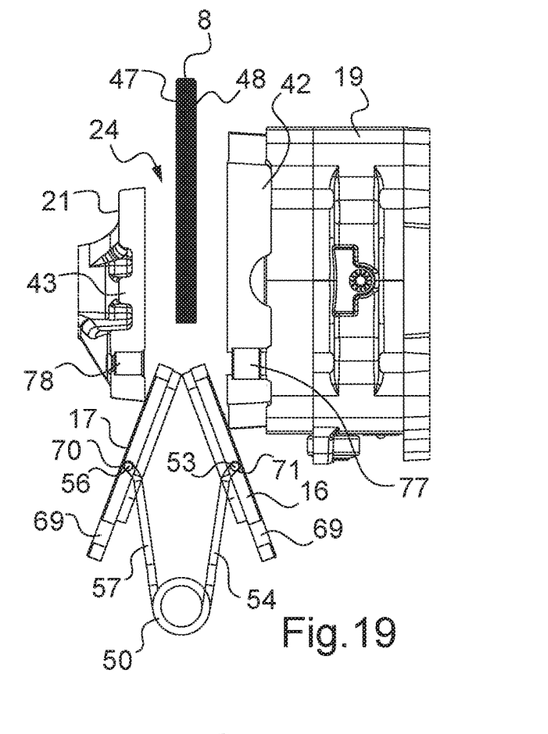
FIGS. 19 to 23 are partial views of the rail vehicle braking system associated with the drive system disk, taken in different states to show the mounting of the brake linings on the drive system disk using the return member.

In FIG. 19, the springs 50, of which only one is visible, are assembled with the linings 16 and 17.

In particular, the end lugs 53 and 56 are respectively inserted into the aperture 71 of the lining 16 and into the aperture 70 of the lining 17. The springs 50 are then in their so-called free or mounting configuration (also visible in FIG. 12).

The linings 16 and 17 are advanced, by a lower insertion opening, towards the space 24 into which the disk 8 is partially inserted. As for the disk 8, it will be noted that this is inserted into that space 24 by an upper insertion opening which is opposite the lower insertion opening and from which it emerges.

In FIG. 19, the linings 16 and 17 are slightly inserted into the space 24, here substantially as far as the wells 77 and 78 for receiving the lining-carrier shafts 51. The insertion of the linings 16 and 17 may be facilitated by the presence of the chamfers 72 provided on these latter.

It will be noted that the linings 16 and 17 are each inclined in this mounting step so as to form a relatively wide inverted V, with the point of the V defined by the two sides 62 of the linings 16 and 17.

In other words, this means that the springs 50 are connected here to the linings 16 and 17 while allowing slight movement of these latter relative to the springs. This movement is here a pivotal movement which may be caused by the application of a force on inserting the linings 16 and 17. This pivotal movement is thus not free.

Figure 20:
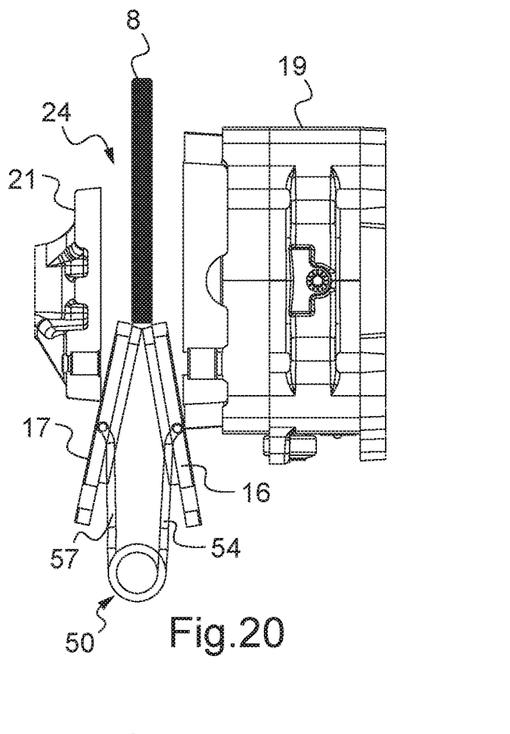

In FIG. 20, the linings 16 and 17 are inserted more deeply into the space 24 towards the disk 8 until they come substantially into contact with the edge surface thereof.

The linings 16 and 17 tend to come together, by their fourth side 64, and are less inclined than in FIG. 19, so as to form a relatively narrow inverted V.

The branches of the springs 50 clamp together and these latter hence tend to force the separation of the linings 16 and 17.

Figure 21:
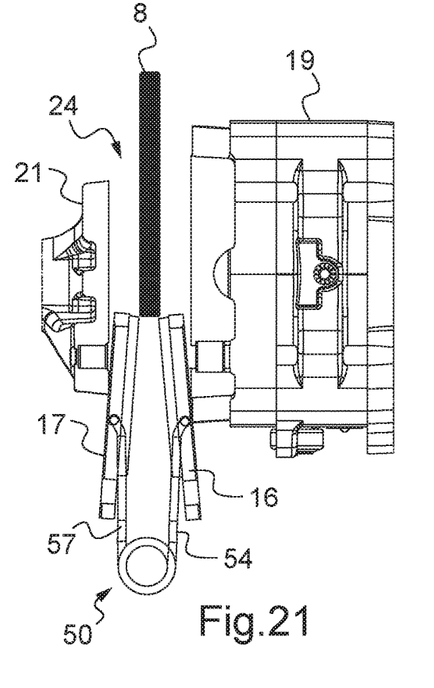

In FIG. 21, the linings 16 and 17 are slightly pivoted around end lugs 53 and 56 of the springs 50, for example by application of a force pressing on the opposite faces 66 of the linings, substantially at the location of the fourth respective sides 64.

The linings 16 and 17 thus come towards each other, at the location of the fourth respective sides 64, while they separate from each other, at the location of the second respective sides 62; thereby providing a sufficient distance for the interposition of the disk 8 between the linings 16 and 17.

In FIG. 21, the linings 16 and 17 no longer have a V-shape and are practically vertical.

Figure 22:
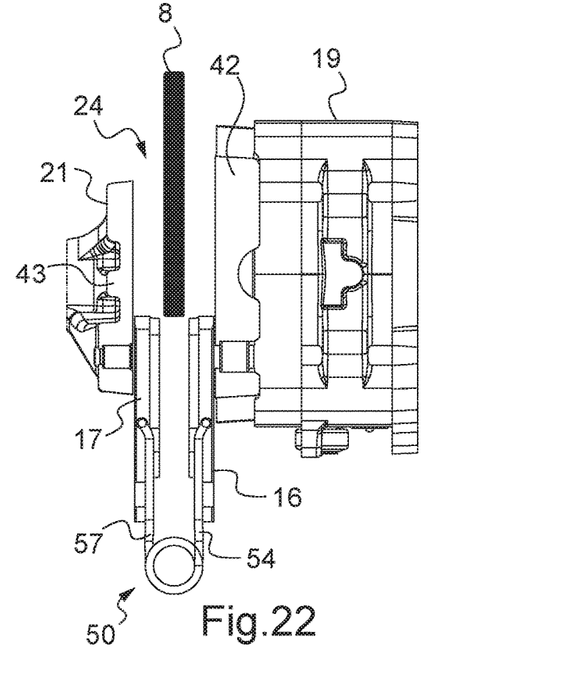

In FIG. 22, the linings 16 and 17 are substantially vertical, the respective opposite sides 66 being partially applied respectively against the first jaw 42 and the second jaw 43.

The branches of the springs 50 clamp together again and these latter force the separation of the linings 16 and 17.

The springs 50 are then in their so-called locomotion configuration (also visible in FIG. 13).

Figure 23:
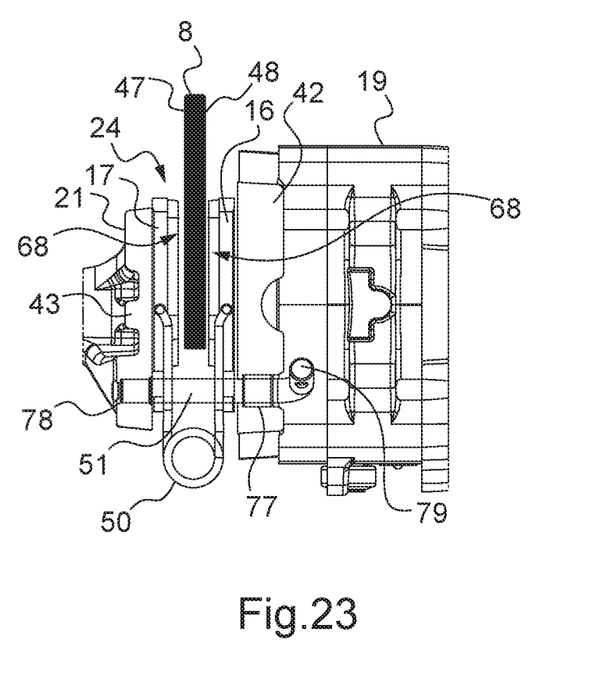

In FIG. 23, the linings 16 and 17 are inserted still deeper into the space 24 until the respective bearing zones 68 of the linings 16 and 17 are situated respectively facing the faces 48 and 47 of the disk 8, and until the notches 69 of the linings 16 and 17 are situated respectively facing the wells 77 and 78 of the respective jaws 42 and 43.

The linings 16 and 17 are then in their predetermined position and each lining-carrier shaft 51 is mounted, by virtue of a gripping loop 79, through a well 77 of the jaw 42 which opens at each end, then through the respective notches 69 of the linings 16 and 17, and then in a well 78 of the jaw 43; so as to keep the linings 16 and 17 in that predetermined position.

This means that the linings 16 and 17 can no longer be displaced in a generally transverse direction of the rail vehicle braking system 10, while they are movable in a generally longitudinal direction of that system 10, for the clamping and unclamping of the disk 8.

In FIG. 23, in which the rail vehicle braking system 10 is ready for use, it will be noted that the apertures 70, 71 and the end lugs 53, 56 are located at a distance from the notches 69.

It will also be noted that the branches 54 and 57 of the springs 50 extend at a distance from the linings 16, 17 and the joining portion 55 is located away from the disk 8; and that these branches 54 and 57 run at least partly along and in immediate proximity to the jaws 42 and 43 such that the end lugs 53 and 56 of the springs 50 cannot escape from the respective apertures 70, 71 so long as the linings 16, 17 are in their predetermined position.

The branches 54 and 57 and the joining portion 55 of the springs 50 extend respectively facing the first side 61 and the third side 63 of the linings 16 and 17, at the location of which the end lugs 53 and 56 are inserted into the apertures 70 and 71 of the linings 16 and 17. The springs 50 are thus mounted in the braking system 10 only via the end lugs 53 and 56. The branches 54 and 57 and the joining portion 55 are thus substantially free in the braking system 10.

It will also be noted that the lining-carrier shafts 51 are located at a distance from the disk 8.

The braking system 10 make it possible, by making the return springs 50 distinct from the linings 16, 17 from the notches 69 and from the lining-carrier shafts 51, and furthermore by placing the apertures 70, 71 and the end lugs 53, 56 at a distance from those notches 69, to have good control both over the return force applied on the linings and over the zones of application of that force on those linings.

Such control over the force applied by the springs and over its application on the linings makes it possible to separate the linings from the disk without unbalancing them or, in other words by returning them in a particularly stable way in the generally longitudinal direction. If the linings are applied in vertical condition to the disk, they are also returned while maintaining a vertical or practically vertical orientation.

It will be noted that the application of the force applied by each spring is made at the location of the bearing zones of the linings on the disk, not outside those bearing zones.

The dismantling, not illustrated, of the linings from the braking system can be carried out by removing the lining-carrier shafts 51 then by pulling, from adjacent the lower insertion opening, the assembly formed by the linings 16, 17 and by the springs 50.

The steps of mounting/dismantling described above may easily be carried out by a user performing the first mounting of the braking system on the vehicle, or by a user carrying out the maintenance of the vehicle and in particular the replacement of the linings.

These users do not need any particular tool since these steps of mounting/dismantling may be carried out simply by manual movements of grasping and/or pressing on the springs, for example at the location of the joining portions formed here by coil turns, and/or on the linings and/or on the lining-carrier shafts.

In the example embodiment described above, the braking member formed in particular by the linings, the springs and the lining-carrier shafts, is arranged substantially symmetrically around the disk.

In a variant not illustrated, it is possible for the braking system to comprise only one return spring and/or each lining could be provided only with a single aperture and/or with a single notch.

In other variants not illustrated:
  the return member is not formed by a torsion spring but rather by a blade spring;
  the return member is not made from metal material but rather from plastic material or even from elastomer material;
  the end lugs of the springs are not necessarily centered on one of the sides at the edge surface of the linings but may be slightly offset relative to the center, provided that the linings are not unbalanced and maintain their stability when they are returned by the springs.
  the end lugs may be connected to the layer of friction material rather than to the base, and/or the linings may not have any base.
  the end lugs are not formed by folded ends but rather by parts added-on to the ends of the elastic portion.
  the connecting members are not formed by apertures but rather by lugs projecting from the edge surface on the same side as the bearing face or on the contrary, on the same side as the opposite face to the bearing face;

the positioning members are not formed by notches but rather by holes or by lugs projecting from the linings;

the pressure agent is hydraulic rather than pneumatic;

it is not a pressure agent but rather an electrical supply of the braking piston and, the case arising, it is possible for the system not to have any spring member;

the compression of the springs may be generated by an electromechanical device rather than by a pneumatic or hydraulic pressure agent; and/or the rail vehicle braking system forms pivoting calipers having direct action by the piston on the linings, but the calipers could have indirect action on the linings, via for example via a wedge and/or an adjuster.

More generally, it is recalled that the invention is not limited to the examples described and illustrated.

The invention claimed is:

1. A rail vehicle braking system for a rail vehicle having brake members with linings and at least one disk, comprising at least one set of said linings, each lining having at least one positioning member configured to enable the mechanical connection of each said lining in a predetermined position on said system relative to said disk and a main bearing face configured to come into contact with said disk to clamp the disk under the direct or indirect action of an actuator of said system, wherein each said lining has several sides defining a circumferential edge surface of said lining, and said rail vehicle braking system further comprising at least one return member configured to separate said linings from said disk to unclamp the disk when said linings are released from the direct or indirect action of said actuator; wherein each lining has at least one connecting member provided on said circumferential edge surface, said at least one respective connecting member is provided substantially at a longitudinal center of one of said sides located at a disk entry side or a disk exit side of said linings, said at least one return member has two end lugs which are opposite, connected to each other by an elastic portion, and configured for each to be mechanically connected with one of said connecting members of said respective linings, and said system is configured such that said connecting members and said end lugs are located at a distance from said at least one positioning member.

2. A system according to claim 1, wherein each said connecting member extends, in cross-section, at the location of a bearing zone defined by said main bearing face of said respective lining.

3. A system according to claim 1, wherein each said positioning member is provided outside said bearing zone of said respective lining.

4. A system according to claim 1, wherein at least one said connecting member is formed by an aperture provided in said edge surface or by a bridging member projecting from said edge surface.

5. A system according to claim 1, wherein each said lining comprises a base and a layer of a friction material added onto said base, and at least one said connecting member is provided in the base or in the layer of friction material.

6. A system according to claim 1, wherein said elastic portion of said at least one return member comprises two branches each connected to a respective end lug and further comprises a joining section connecting the two said branches, said system being configured such that said branches extend from said end lugs at a distance from said linings and said joining section is provided to be at a remote opposite location from the disk.

7. A system according to claim 1, wherein said at least one return member is formed by a torsion spring or by a blade spring.

8. A system according to claim 1, wherein said end lugs of said at least one return member are formed by folded ends of said elastic portion or by added-on parts.

9. A system according to claim 1, wherein said end lugs of said at least one return member are mechanically connected with said respective connecting members by insertion by force, or by welding, or by riveting or by bonding.

10. A system according to claim 1, wherein said at least one return member is formed of metal or plastic material and is configured to apply a force of the order of approximately 30 N to approximately 100 N to said linings.

11. A system according to claim 1, further comprising two said return members and four said connecting members, which are disposed on opposite sides of the two said linings.

12. A rail vehicle braking system according to claim 1, further comprising a parking brake having a body provided with a cylinder having a cavity, with a said lining mounting mechanically connected to said cylinder and configured to bear said linings and receive said disk, at least partly, and with a said actuator comprising a braking piston at least partly housed in said cavity, movable relative to said body and configured to act on at least one said lining through said lining mounting.

13. A system according to claim 12, wherein said lining mounting comprises two jaws separated by a space provided to receive at least partly said disk, as well as at least one lining-carrier shaft configured to cooperate with said positioning members of said linings and lock these latter in said predetermined position, said at least one lining-carrier shaft being located at a distance from said disk when the latter is received in said space between said jaws.

14. A system according to claim 13, wherein a first of the two said jaws is mounted on said cylinder while a second of the two said jaws is mounted on said first jaw via at least one column which extends from said first jaw, and said braking piston acts directly on said lining mounted on said first jaw and indirectly, by movement of said body via said at least one column and via said second jaw, on another said lining mounted on that second jaw.

15. A system according to claim 2, wherein each said positioning member is provided outside said bearing zone of said respective lining.

16. A system according to claim 2, wherein at least one said connecting member is formed by an aperture provided in said edge surface or by a bridging member projecting from said edge surface.

17. A system according to claim 3, wherein at least one said connecting member is formed by an aperture provided in said edge surface or by a bridging member projecting from said edge surface.

18. A system according to claim 1, wherein the edge surface of said lining extends between a first end edge, a second end edge opposite from the first end edge, a first lateral edge, and a second lateral edge opposite from the first lateral edge, and wherein the center of one of said sides is centered between the first end edge, the second end edge, the first lateral edge, and the second lateral edge.

19. A system according to claim 1, wherein one of said sides comprises a fillet having a concavity directed toward an opposite one of said sides.

20. A system according to claim 1, wherein one of said sides comprises a chamfer formed in a base.

* * * * *